(12) United States Patent  
Xu

(10) Patent No.: US 9,015,911 B2  
(45) Date of Patent: Apr. 28, 2015

(54) COUPLING DEVICE FOR SECURING AN ISOFIX CHILD SEAT TO A VEHICLE

(71) Applicant: Max-Inf (Ningbo) Baby Product Co., Ltd., Ningbo, Zhejiang (CN)

(72) Inventor: Lihong Xu, Ningbo (CN)

(73) Assignee: Max-Inf (Ningbo) Baby Product Co., Ltd, Ningbo (CN)

( * ) Notice: Subject to any disclaimer, the term of this patent is extended or adjusted under 35 U.S.C. 154(b) by 0 days.

(21) Appl. No.: 14/109,970

(22) Filed: Dec. 18, 2013

(65) Prior Publication Data

US 2014/0375094 A1    Dec. 25, 2014

(30) Foreign Application Priority Data

Jun. 24, 2013   (CN) ...................... 2013 2 0362028 U

(51) Int. Cl.
*B60N 2/28*    (2006.01)

(52) U.S. Cl.
CPC .................................. *B60N 2/2887* (2013.01)

(58) Field of Classification Search
CPC .... B60N 2/366; B60N 2/2887; B60N 2/2806; B60N 2/01583; B60N 2/20; B60N 2/3011; B60N 2/305; B60N 2205/35; B60N 2/01541; B60N 2/10; B60R 22/26; F16B 45/02; F16B 45/025; A01K 27/005; A44B 11/12
USPC ..................................... 24/170, 599.1–599.9
See application file for complete search history.

(56) References Cited

U.S. PATENT DOCUMENTS

| | | | | |
|---|---|---|---|---|
| 4,136,422 A * | 1/1979 | Ivanov et al. | .................... | 24/170 |
| 4,606,577 A * | 8/1986 | Hirama et al. | ................. | 297/331 |
| 4,925,221 A * | 5/1990 | Carmody et al. | ............. | 292/200 |
| 6,412,849 B1 * | 7/2002 | Fast | ........................... | 296/65.03 |
| 7,152,926 B2 * | 12/2006 | Wrobel | .................... | 297/378.13 |
| 7,296,840 B2 * | 11/2007 | Martone et al. | ............ | 296/65.03 |
| 7,338,128 B2 * | 3/2008 | Inoue et al. | .............. | 297/378.13 |
| 2004/0007909 A1 * | 1/2004 | Bonk | ....................... | 297/378.13 |
| 2004/0208692 A1 * | 10/2004 | Anthony et al. | .............. | 403/327 |
| 2005/0184549 A1 * | 8/2005 | Robinson et al. | .......... | 296/65.03 |
| 2006/0108847 A1 * | 5/2006 | O'Callaghan et al. | ..... | 297/344.1 |
| 2006/0250013 A1 * | 11/2006 | Shao | .............................. | 297/366 |
| 2007/0067970 A1 * | 3/2007 | Claus et al. | .................. | 24/599.9 |
| 2009/0241305 A1 * | 10/2009 | Buckingham | ................ | 24/599.1 |
| 2009/0243310 A1 * | 10/2009 | Buckingham et al. | ........ | 292/215 |
| 2010/0013282 A1 * | 1/2010 | Balensiefer | ................... | 297/253 |
| 2010/0072798 A1 * | 3/2010 | Clement | ....................... | 297/253 |
| 2011/0243653 A1 * | 10/2011 | Buckingham et al. | ..... | 403/322.4 |

* cited by examiner

*Primary Examiner* — Robert J Sandy
*Assistant Examiner* — David Upchurch

(57) ABSTRACT

A coupling device for securing an ISOFIX child seat to a vehicle is provided with a housing including a first opening; a first pivot member adjacent to the first opening and pivotably secured to the housing, the first pivot member including first and second slots; a second pivot member forward of the first pivot member and pivotably secured to the housing, the second pivot member including a lock pin configured to receive in the second slot; a first biasing member in the housing and anchored on the second pivot member to interconnect the first and second pivot members so that the first and second pivot members can rotate clockwise; and a pulling member having one end held secure to the second pivot member and extending outwardly so that the second pivot member can rotate counterclockwise. The coupling device can be easily connected to or disengaged from an anchorage member.

6 Claims, 4 Drawing Sheets

COUPLING DEVICE FOR SECURING AN ISOFIX CHILD SEAT TO A VEHICLE

BACKGROUND OF THE INVENTION

1. Field of the Invention

The invention relates to child restraint and safety devices and more particularly to a coupling device for securing an ISOFIX child seat to a vehicle.

2. Description of Related Art

A child safety seat is designed for the safety of a child seated on a passenger car. The child safety seats are seats that can protect children from injury or death during collisions.

A number of devices are implemented to effect safety of a child seated on a passenger car. For example, a seat belt is installed on the child safety seat of a passenger car. Alternatively, an ISOFIX is adopted. ISOFIX is the international standard for attachment points for child safety seats in passenger cars. ISOFIX defines standard attachment points to be manufactured into cars, enabling compliant child safety seats to be quickly and safely secured. Seats are secured with a single attachment at the top by a tether and two anchorage points at the base of each side of the seat. However, the conventional anchor coupling is disadvantageous because there is no indication of whether it is secured, safety is low, it is inconvenient in use, structural components are complicated, reliability is low, and the manufacturing cost is very high. Thus, the need for improvement still exists.

SUMMARY OF THE INVENTION

It is therefore one object of the invention to provide a coupling device for securing an ISOFIX child seat to a vehicle having the advantages of being reliable, simple in components, and convenient in use.

For solving problems associated with the prior art, the invention is provided with a coupling device for securing an ISOFIX child seat to a vehicle comprising a housing including a first opening at a rear end; first pivot member disposed adjacent to the first opening and pivotably secured to the housing, the first pivot member including a first slot and a second slot; a second pivot member disposed forwardly of the first pivot member and pivotably secured to the housing, the second pivot member including a lock pin configured to receive in the second slot to be locked; a first biasing member disposed in the housing and anchored on the second pivot member to interconnect the first pivot member and the second pivot member so that both the first pivot member and the second pivot member are configured to rotate clockwise; and pulling means having one end held secure to a forward end of the second pivot member and extending forwardly out of the housing so that the second pivot member is configured to rotate counterclockwise.

Preferably, the housing further comprises a window at a forward end, and further comprising a third pivot member and a second biasing member urging against both the housing and the third pivot member so that the third pivot member is configured to clockwise rotate, wherein the third pivot member includes at least two color portions on a forward end.

Preferably, the second pivot member further comprises a transverse bar at a forward end, and wherein the pulling means is a closed loop held secured to the transverse bar.

Preferably, the housing further comprises a groove on a rear portion, and further comprising a roll rotatably disposed in the groove and being in contact with the pulling means.

Preferably, the second biasing member is a helical spring, the third pivot member further comprises a projection with one end of the second biasing member put thereon, and an other end of the second biasing member urging against the housing.

Preferably, the first biasing member is a helical torsion spring.

The invention has the following advantages in comparison with the prior art:

It can be easily connected to an anchorage member of a vehicle. It can be easily disengaged from the anchorage member of a vehicle. That is, both fastening and unfastening are made easy.

A visual observation of the green or red indicator through the window can determine whether the fastening is secured or not.

Finally, its operation is reliable, its structural components are simple, and its manufacturing cost is relatively low.

The above and other objects, features and advantages of the invention will become apparent from the following detailed description taken with the accompanying drawings.

DETAILED DESCRIPTION OF THE INVENTION

Figure 1:
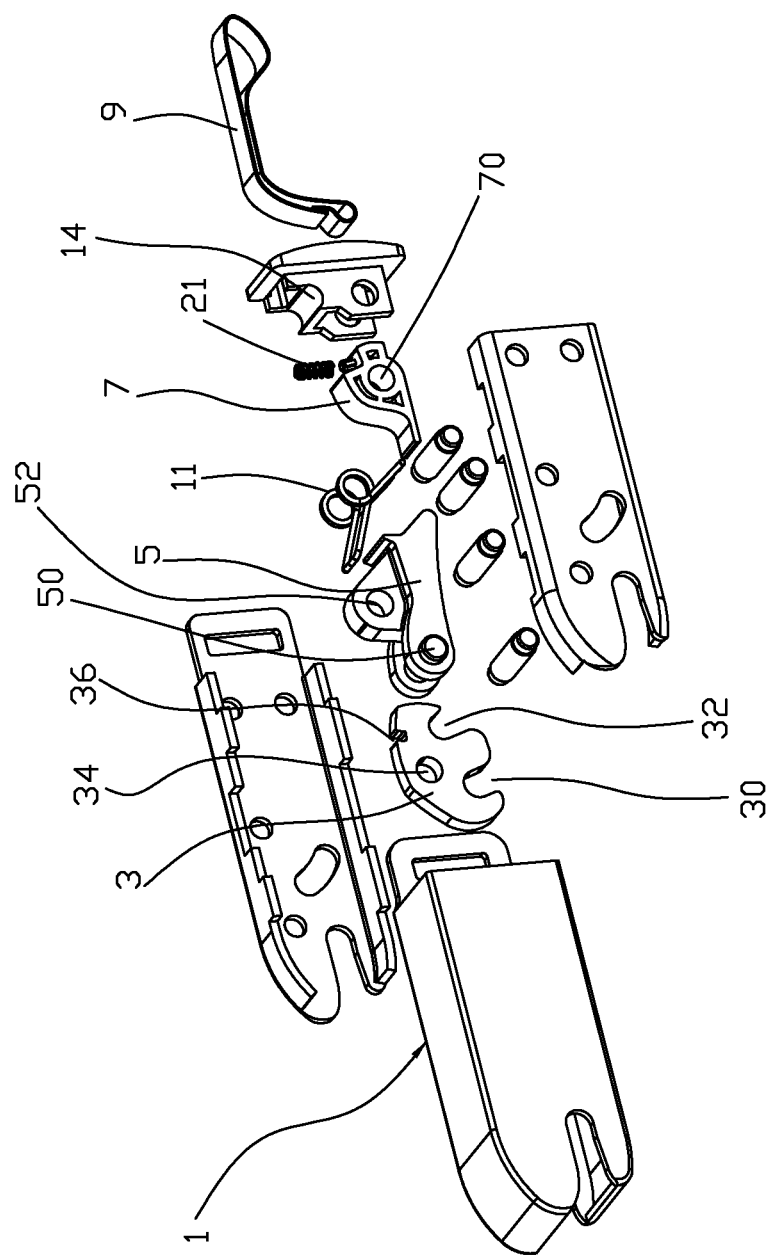
FIG. 1 is an exploded view of a coupling device for securing an ISOFIX child seat to a vehicle according to the invention.
Figure 2:
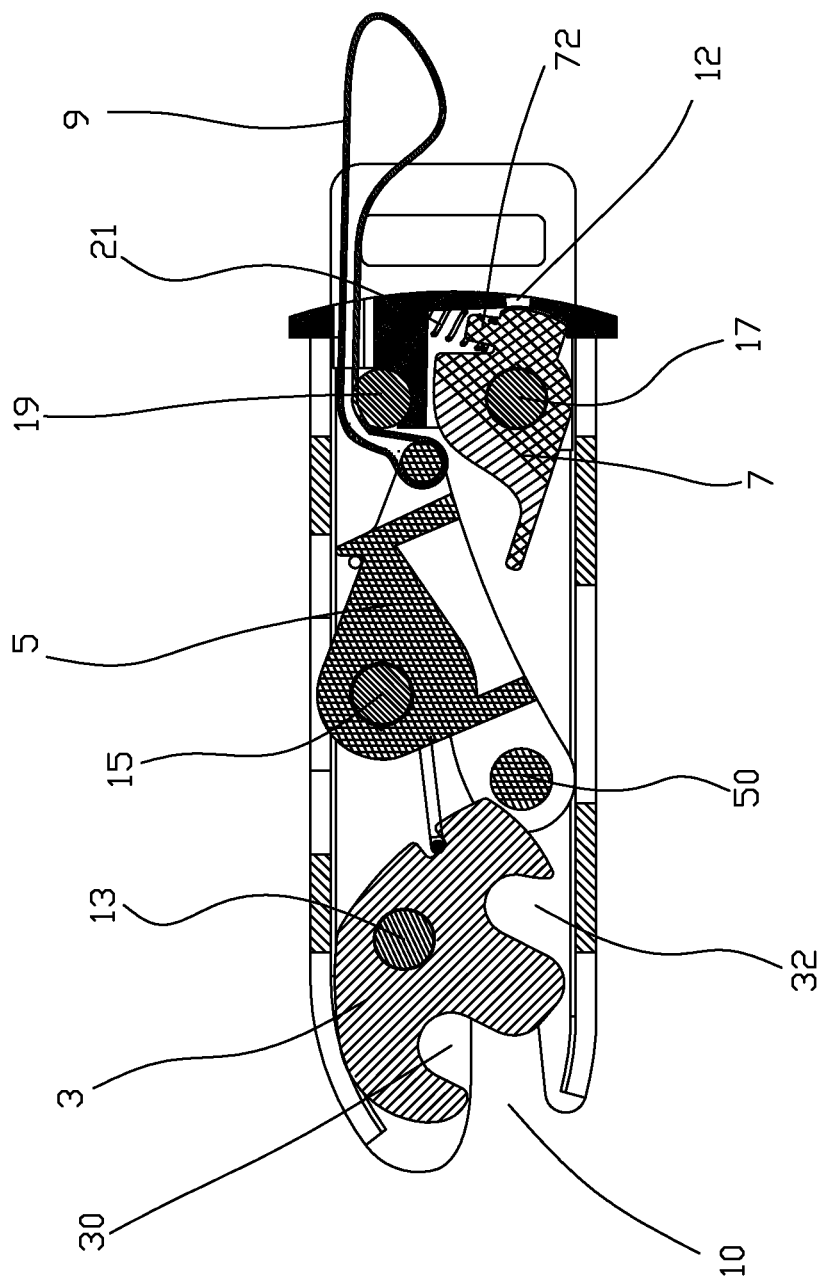
FIG. 2 is a longitudinal sectional view of the assembled coupling device where the third pivot member is indicated by red because the coupling device is deactivated.
Figure 3:
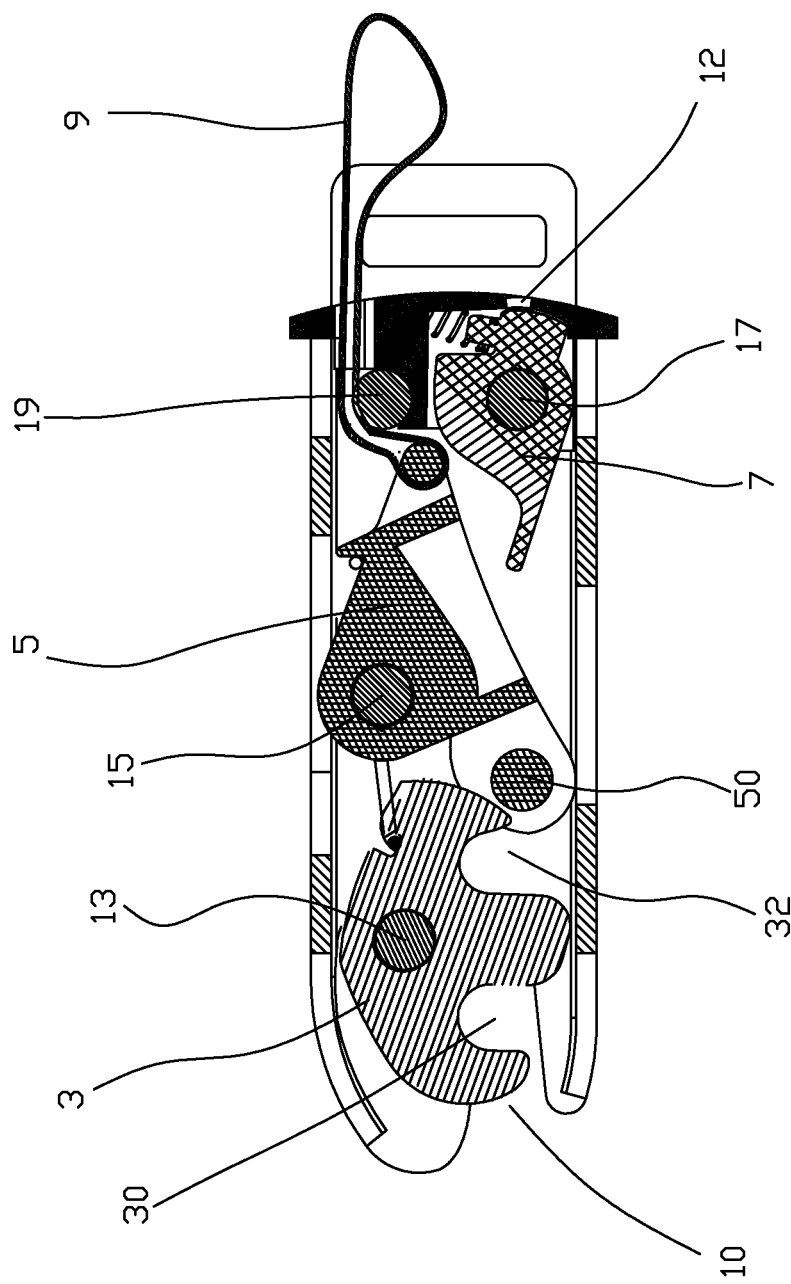
FIG. 3 is a view similar to FIG. 2 where the third pivot member is still indicated by red because the coupling device is not secured.
Figure 4:
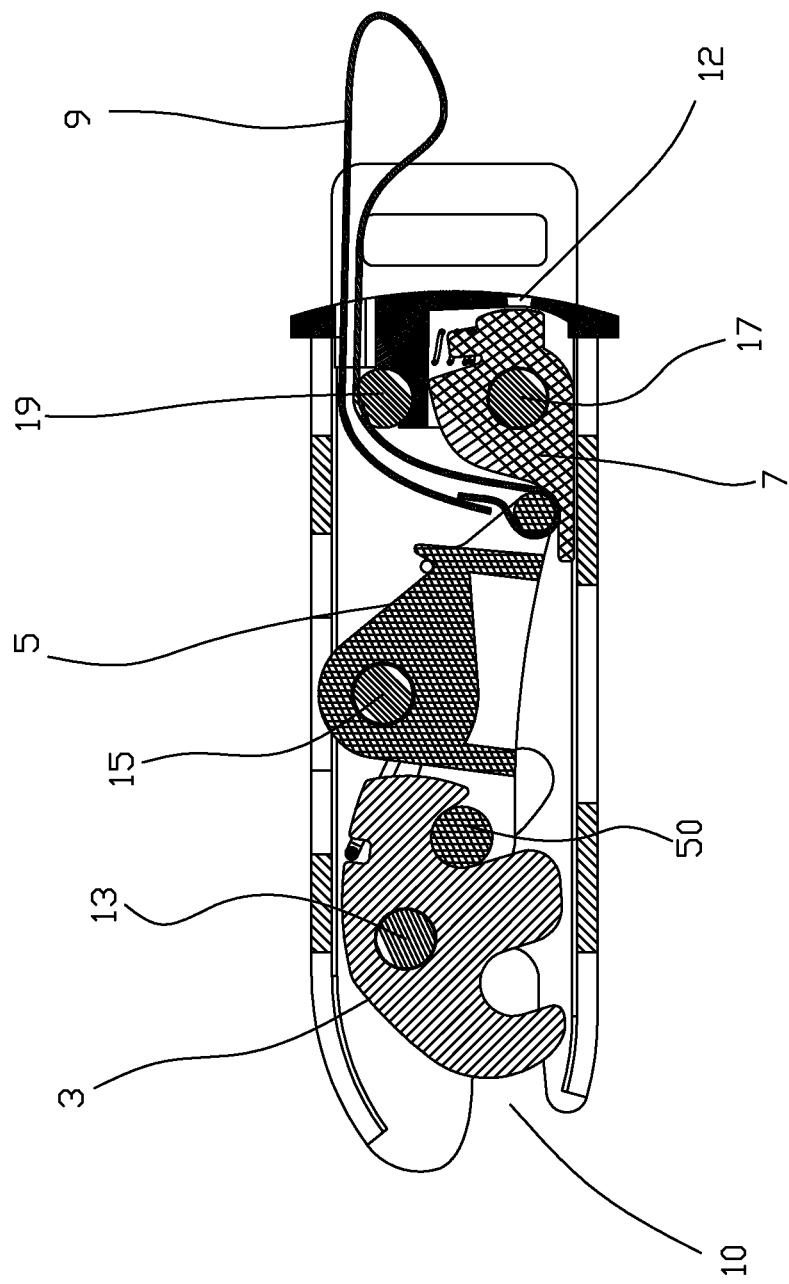
FIG. 4 a view similar to FIG. 2 where the third pivot member is indicated by green because an ISOFIX child seat is secured to a vehicle by the coupling device.

Referring to FIGS. 1 to 4, a coupling device for securing an ISOFIX child seat to a vehicle in accordance with the invention is shown. The coupling device is attached to an ISOFIX child seat and comprises the following components as discussed in detail below.

A housing 1 consists of four portions and is elongated. The housing 1 includes a first opening 10 at a rear end and a first pivot 13.

A plate shaped first pivot member 3 is provided adjacent to the first opening 10 and includes a pivot hole 34 pivotably secured to the housing 1 by the first pivot 13, a first slot 30, a second slot 32, and a cavity 36 opposite to the second slot 32.

A second pivot member 5 is provided forwardly of the first pivot member 3 and includes a lock pin 50 adapted to receive in the second slot 32, and a pivot hole 52 pivotably secured to the housing 1 by a second pivot 15. A first spring (e.g., helical torsion spring) 11 has a coil put on the second pivot 15, a rear end anchored in the cavity 36, and a forward end fastened on the second pivot member 5.

A housing 1 further includes a forward window 12. A third pivot member 7 is provided adjacent to the forward window 12 and includes a pivot hole 70 pivotably secured to the housing 1 by a third pivot 17. A second spring (e.g., helical spring) 21 is provided. An upper portion of a rear end of the third pivot member 7 is coated with red (i.e., red indicator) and a lower portion of the rear end thereof is coated with green (i.e., green indicator).

The second spring 21 has a lower portion put on a projection 72 of the third pivot member 7 and the other end urging against the housing 1.

A groove 14 is provided on a rear part of the housing 1 with a roll 19 rotatably disposed therein. A pulling member 9 has a rear end put on a transverse bar (not numbered) in a forward end of the second pivot member 5, a forward portion extending out of the housing 1, and a portion between the front and rear ends contacting the roll 19. Preferably, the pulling member 9 is a closed loop, For securing an ISOFIX child seat to a loop on a car seat of a vehicle, a passenger may perform the following steps: First, pushing the coupling device toward an anchorage member (not shown) such as one shaped as a U secured to a joining portion of the car seat and the seat back until the anchorage member contacts the first slot 30. The passenger may continue to push the coupling device to counterclockwise the first pivot member 3 (see FIGS. 2 and 3). Also, the lock pin 50 moves closer to the second slot 32. The passenger may continue to push the coupling device to cause the first spring 11 to clockwise pivot the second pivot member 5 until the lock pin 50 is received in the second slot 32. Also, the anchorage member is received in the first slot 30. Further, the third pivot member 7 rotates counterclockwise after contacting the second pivot member 5 and being pushed downward by the second pivot member 5. The red indicator of the third pivot member 7 is aligned with the forward window 12 until now. The counterclockwise pivotal movement of the third pivot member 7 will be stopped when it contacts a bottom of the housing 1. At this position, the green indicator of the third pivot member 7 is aligned with the forward window 12 (see FIG. 4). Thus, the passenger can confirm that the anchorage member is locked in the first slot 30 by viewing the green indicator of the third pivot member 7 through the forward window 12. As a result, the ISOFIX child seat is secured to the vehicle by the coupling device.

For disengaging the ISOFIX child seat to the anchorage member, the passenger may perform the following steps: First, pulling the pulling member 9 to counterclockwise rotate the second pivot member 5 which thus disengages from the third pivot member 7 (see FIGS. 3 and 4). Also, the third pivot member 7 rotates clockwise by the expansion of the second spring 21. The first spring 11 forces the first pivot member 3 to rotate clockwise until the lock pin 50 clears the second slot 32 and the anchorage member is not locked by the first slot 30 (see FIG. 2). At this position, the red indicator of the third pivot member 7 is aligned with the forward window 12. Thus, the passenger can confirm that the anchorage member is not locked in the first slot 30 by viewing the red indicator of the third pivot member 7 through the forward window 12. As a result, the ISOFIX child seat is unfastened.

The invention has the following advantages: It can be easily connected to an anchorage member of a vehicle. It can be easily disengaged from the anchorage member of a vehicle. That is, both fastening and unfastening are made easy. A visual observation of the green or red indicator through the window can determine whether the fastening is secured or not. Finally, its operation is reliable, its structural components are simple, and its manufacturing cost is relatively low.

While the invention has been described in terms of preferred embodiments, those skilled in the art will recognize that the invention can be practiced with modifications within the spirit and scope of the appended claims.

What is claimed is:

1. A coupling device for securing an ISOFIX child seat to a vehicle comprising:
    a housing (1) including a first opening (10) at a rear end;
    a first pivot member (3) disposed adjacent to the first opening (10) and pivotably secured to the housing (1), the first pivot member (3) including a first slot (30) and a second slot (32);
    a second pivot member (5) disposed forwardly of the first pivot member (3) and pivotably secured to the housing (1), the second pivot member (5) including a lock pin (50) configured to receive in the second slot (32) to be locked;
    a first biasing member (11) disposed in the housing (1) and anchored on the second pivot member (5) to interconnect the first pivot member (3) and the second pivot member (5) so that both the first pivot member (3) and the second pivot member (5) are configured to rotate clockwise; and
    pulling means (9) having one end held secure to a forward end of the second pivot member (5) and extending forwardly out of the housing (1) so that the second pivot member (5) is configured to rotate counterclockwise.

2. The coupling device of claim 1, wherein the housing further comprises a window (12) at a forward end, and further comprising a third pivot member (7) and a second biasing member (21) urging against both the housing and the third pivot member (7) so that the third pivot member (7) is configured to clockwise rotate, wherein the third pivot member (7) includes at least two color portions on a forward end.

3. The coupling device of claim 1, wherein the second pivot member (5) further comprises a transverse bar at a forward end, and wherein the pulling means (9) is a closed loop held secured to the transverse bar.

4. The coupling device of claim 3, wherein the housing (1) further comprises a groove (14) on a rear portion, and further comprising a roll (19) rotatably disposed in the groove (14) and being in contact with the pulling means (9).

5. The coupling device of claim 2, wherein the second biasing member (21) is a helical spring, the third pivot member (7) further comprises a projection (72) with one end of the second biasing member (21) put thereon, and an other end of the second biasing member (21) urging against the housing (1).

6. The coupling device of claim 1, wherein the first biasing member (11) is a helical torsion spring.

\* \* \* \* \*